United States Patent [19]

Roderfeld et al.

[11] Patent Number: 4,700,717
[45] Date of Patent: Oct. 20, 1987

[54] SELF-PROPELLED HARVESTER THRESHER

[75] Inventors: Heinrich Roderfeld; Johannes Dammann, both of Harsewinkel, Fed. Rep. of Germany

[73] Assignee: Claas Ohg, Harsewinkel, Fed. Rep. of Germany

[21] Appl. No.: 734,386

[22] Filed: May 14, 1985

[30] Foreign Application Priority Data

May 15, 1984 [DE] Fed. Rep. of Germany ....... 3417929

[51] Int. Cl.$^4$ .................................................. A01F 7/04
[52] U.S. Cl. ................................... 130/27 T; 130/27 P
[58] Field of Search ................. 130/27 T, 27 R, 27 F, 130/27 J, 27 P

[56] References Cited

U.S. PATENT DOCUMENTS

| 442,964 | 12/1890 | Emeis | 130/27 P |
| 1,110,768 | 9/1914 | George | 130/27 P |
| 1,781,472 | 11/1930 | Nagle | 130/27 T |
| 2,507,669 | 5/1950 | Heth | 130/27 R |
| 4,474,188 | 10/1984 | Kashino et al. | 130/27 J |
| 4,478,226 | 10/1984 | Tophinke | 130/27 P |
| 4,606,356 | 8/1986 | Odahara | 130/27 T |

FOREIGN PATENT DOCUMENTS

| 242628 | 1/1960 | Australia | 130/27 D |
| 2057240 | 4/1981 | United Kingdom | 130/27 T |

Primary Examiner—Robert Peshock
Assistant Examiner—Cary E. Stone
Attorney, Agent, or Firm—Michael J. Striker

[57] ABSTRACT

A self-propelled harvester thresher has a threshing mechanism operating in accordance with a tangential product flow and having a threshing drum and a threshing basket, a separating device operating in accordance with the axial product flow and having at least one separating rotor and a housing, and a transferring drum located between the threshing mechanism and the separating device and having an axis of rotation which is located above the axis of rotation of the threshing drum and above the separating rotor in its receiving region, wherein the transferring drum is at least partially surrounded by a guiding member which corresponds to an outer circular surface of the drum and is provided with guiding skids.

10 Claims, 4 Drawing Figures

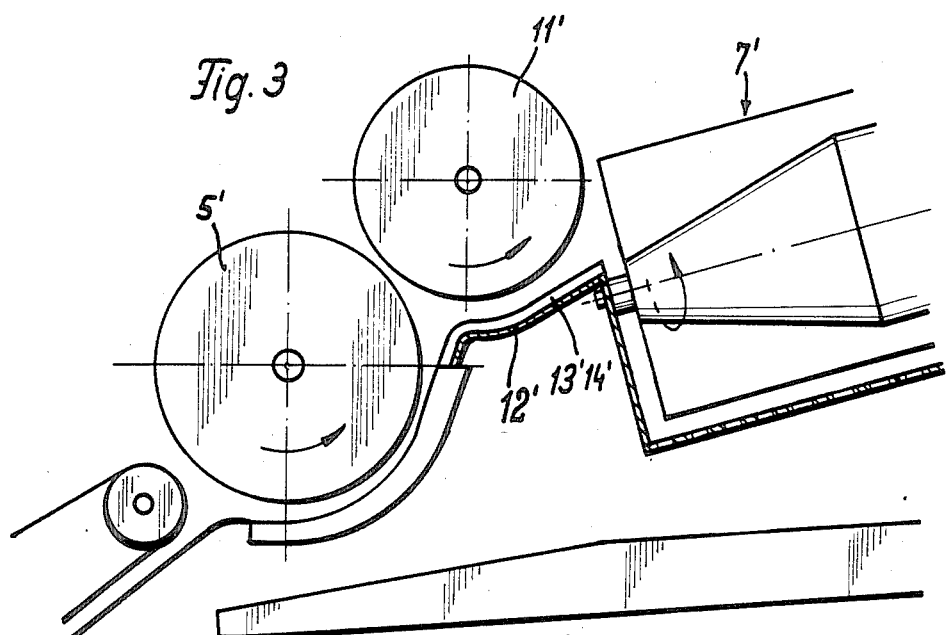
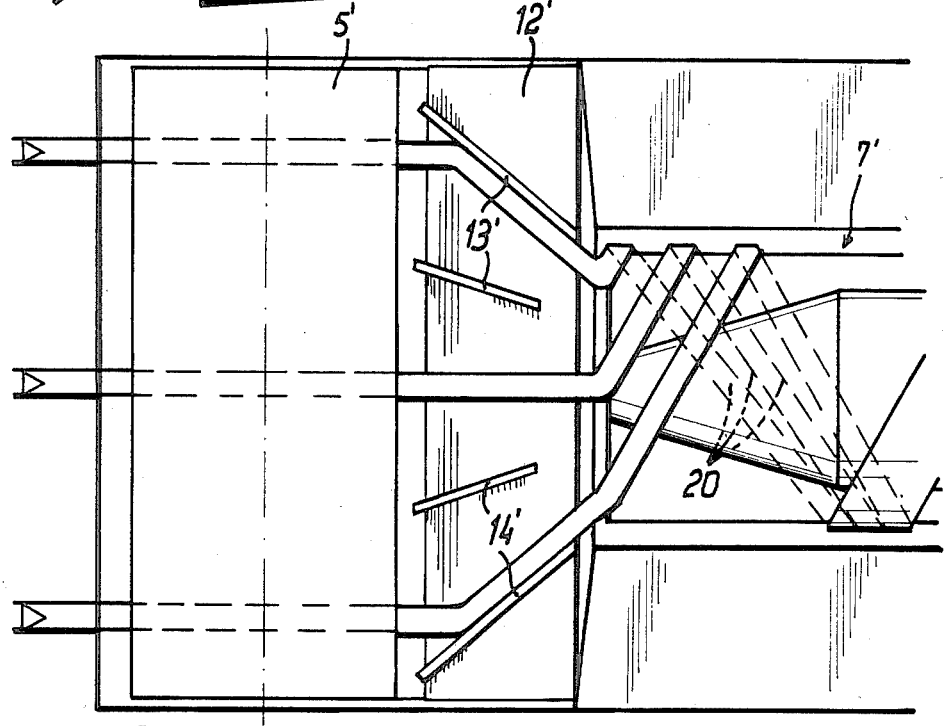

SELF-PROPELLED HARVESTER THRESHER

BACKGROUND OF THE INVENTION

The present invention relates to a self-propelled harvester thresher. More particularly, it relates to a self-propelled harvester thresher which has a threshing mechanism including a threshing drum and threshing basket and operating in accordance with a tangential flow system, and a subsequent separating device including at least one separating rotor and a housing operating in accordance with an axial flow system.

Harvester threshers of the above general type are known in the art. In known harvester threshers it is difficult to transfer the threshed product from the threshing mechanism to the separating device, and the transfer is always connected with high energy consumption. The source of this problem is that first of all the axis of rotation of the threshing drum extends transversely to the axis of rotation of the separating rotor. This makes the product transfer more difficult on the one hand, but is of advantage in the sense of a space economical construction.

SUMMARY OF THE INVENTION

Accordingly, it is an object of the present invention to provide a harvester thresher of the above mentioned general type, which avoids the disadvantages of the prior art.

More particularly, it is an object of the present invention to provide a harvester thresher of the above mentioned general type, which satisfies the respective requirements made with respect thereto especially in the sense of an unobjectionable product transfer in satisfactory manner.

In keeping with these objects and with others which will become apparent herein after, one feature of the present invention resides, briefly stated, in a harvester thresher in which a transferring drum is provided between the threshing mechanism and the separating device and has an axis which is located higher than the axis of the threshing drum and also higher than the axis of the separating rotor in its receiving region, and the transferring drum is surrounded at least locally by a guiding member which corresponds to the enveloping circle of the drum and is provided with guiding skids arranged at a distance from the enveloping circle of the separating rotor.

When the harvester thresher is designed in accordance with the above specified features, it avoids the disadvantages of the prior art and provides an unobjectionable product transfer in a satisfactory manner from the threshing mechanism to the separating device.

In accordance with another feature of the present invention, the guiding member is arranged under the transferring drum and its front side is located near the discharge side of the threshing basket whereas its rear side is located near the end side of the separating rotor.

Still another advantageous feature of the present invention is that the guiding member is arranged above the transferring drum, wherein its discharge end is associated from above radially with the product receiving region of the separating rotor or rotors.

A further feature of the present invention is that the guiding member in its both end regions has at least one inclined guiding skid which extend toward one another in a product transporting direction.

It is advantageous in accordance with still a further feature of the present invention when the closest distance between the skids substantially corresponds to the width of an inlet opening of the housing for the separating roller.

In self-propelled harvester threshers with two separating rotors and the respective housings, the supply of products to the individual separating rotors is guaranteed when the guiding member is provided, in addition to the guiding skids in both end regions, with at least one wedge-shaped segment arranged in the center of the guiding member and subdividing the product stream into two partial streams.

It is recommended to provide the direction of rotation of the transferring drum opposite to the direction of rotation of the threshing drum, and to cover the transferring drum from above by the guiding member.

In this embodiment it is also recommended to supply the product to be separated from the transferring drum from above radially to at least one separating rotor.

In accordance with another embodiment the transferring drum and the threshing drum can have the same direction of rotation, and the transferring drum is partially covered by the guiding member from below.

In such embodiment it is advantageous to supply the product to be separated from the transferring drum to the separating rotor at the end side in an axial direction.

For covering the transferring drum partially from above or from below by the guiding member, in accordance with a further embodiment of the invention it is advantageous when the guiding member bridges the distance between the threshing mechanism and the separating device in a tight manner.

It is also advantageous when the width of the transferring drum corresponds to the width of the threshing drum.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a side view of a fragment of the harvester thresher of FIG. 1, in accordance with another embodiment of the invention; and FIG. 4 is a plan view of the fragment of FIG. 3.

DESCRIPTION OF PREFERRED EMBODIMENTS

Figure 1:
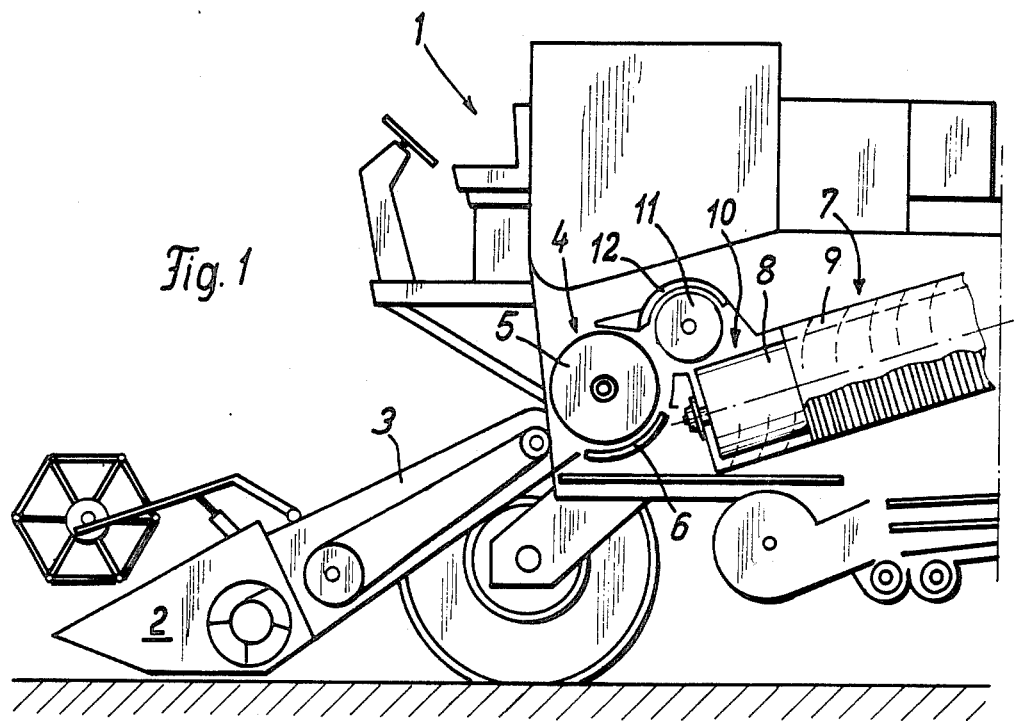
FIG. 1 is a side view of a front part of a self-propelled harvester thresher in accordance with the present invention.

A front part of a self-propelled harvester thresher in accordance with the present invention is identified as a whole with reference numeral 1. The front part has a front cutting mechanism trough 2, an inclined conveyor 3, and a threshing mechanism 4 arranged after the latter.

The threshing mechanism 4 which operates in accordance with the principle of tangential flow is composed in a known manner of a threshing drum 5 extending transversely to a traveling direction, and a threshing basket 6 associated with the threshing drum 5. A separating device 7 which operates in accordance with the principle of an axial flow is located after the threshing mechanism 4 with a small distance therebetween. The separating device 7 is composed of two rotors 8 which extend transversely to the threshing drum and are slightly inclined, and two housings 9 surrounding the rotors 8. Each of the housings 9 has an inlet opening 10 which is accessible from above.

A driveable transferring drum 11 is located above the inlet openings 10 of the housings 9 of the separating device, and also above the axis of rotation of the threshing drum 5 of the threshing mechanism. The transferring drum 11 is driven in rotation in a direction which is opposite to the direction of rotation of the threshing drum 5. A guiding member 12 covers the transferring drum 11 from above. The guiding member 12 bridges the discharge region of the threshing drum 5 of the threshing mechanism and the receiving region of the housings 9 of the separating device in a product-tight manner.

Figure 2:
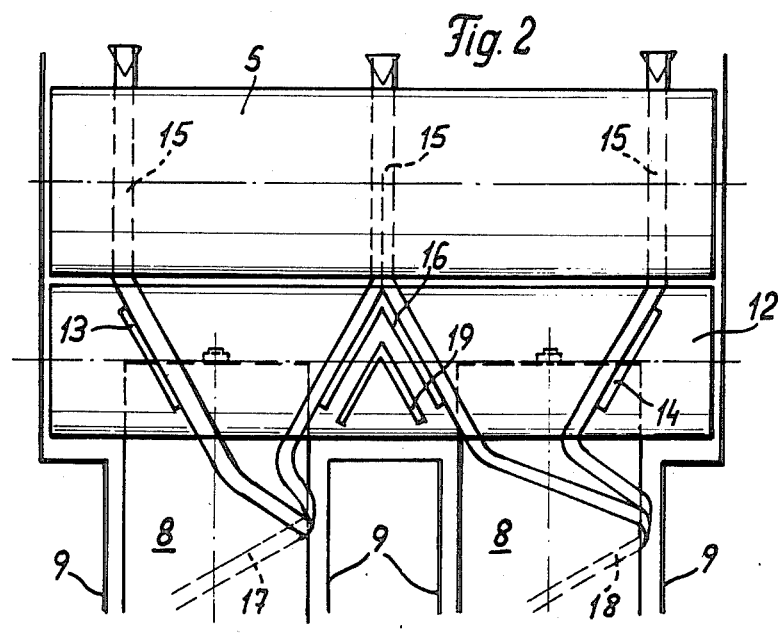
FIG. 2 is a plan view of a fragment of the harvester thresher of FIG. 1, on an enlarged scale.

As can be seen in particular from FIG. 2, the guiding member 12 is provided in its both end regions with a skid 13 and 14 respectively. The product stream supplied from the threshing drum 5 is subdivided into three small individual streams 15 which are guided toward one another by the mentioned skids 13 and 14. A wedge-shaped segment 16 provided in the center of the guiding member 12 separates the product stream into two partial streams 17 and 18 which are supplied from above to the respective housing-rotor unit 8, 9. A further segment 19 assists in the separation of the product stream by the segment 16.

The harvester thresher in accordance with the embodiment shown in FIGS. 3 and 4 differs from that of the embodiment of 1 and 2 in that it has a guiding member 12' which is located under a transferring drum 11'. The guiding member 12' is provided with four skids 13' and 14' which guide the product stream supplied from a threshing drum 5' toward one another so as to form a tight small stream 20. This stream 20 is supplied axially to a single separating device 7'. The threshing drum 5' and the transferring drum 11' in this embodiment rotate in the same direction of rotation, so that the product stream is supplied to the separating device in the axial direction.

It will be understood that each of the elements described above, or two or more together, may also find a useful application in other types of constructions differing from the types described above.

While the invention has been illustrated and described as embodied in a self-propelled harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A self-propelled harvester thresher, comprising a threshing mechanism operating with a tangential product flow and extending transversely to a travelling direction, said threshing mechansim having a threshing drum rotatable about an axis of rotation, and a threshing basket associated with said threshing drum; a separating device extending in the travelling direction, located after said threshing mechansim in a direction of product flow and operating with an axial product flow, said separating device having at least one separating rotor having a receiving region, and at least one housing associated with said separating rotor; and a transferring mechanism for transferring the product, without its threshing or separating, from said threshing mechansim extending transversely to the travelling direction to said separating device extending in the travelling direction, said transferring mechanism including a transferring drum arranged between said threshing mechanism and said separating device and rotatable about an axis which lies higher than the axis of rotation of said threshing drum of said threshing mechanism and higher than said receiving region of said separating rotor of said separating device, and a guiding member surrounding at least partially said transferring drum, said guiding member being provide with a plurality of guiding skids.

2. A self-propelled harvester thresher as defined in claim 1, wherein said threshing basket of said threshing mechanism has a discharge side, said separating rotor of said separating device having an end side, said guiding member being arranged under said transferring drum and having a front side located near said discharge side of said threshing basket and a rear side located near said end side of said separating rotor.

3. A self-propelled harvester thresher as defined in claim 1, wherein said guiding member is located above said transferring drum and has a discharge end which extends above and radially toward said receiving region of said separating rotor.

4. A self-propelled harvester thresher as defined in claim 1, wherein said guiding member has two end regions and is provided in said end regions with one of said guiding skids respectively, said guiding skids being inclined so that they extend toward one another as considered in the direction of product flow.

5. A self-propelled harvester thresher as defined in claim 4, wherein said housing for said separating rotor has an inlet opening, said guiding skids having therebetween a smallest distance which substantially corresponds to the width of said inlet opening of said housing.

6. A self-propelled harvester thresher as defined in claim 1, wherein said guiding member has two end regions and a center therebetween, said guiding skids being provided in said end regions of said guiding member respectively, said guiding member further having a wedge-shaped segment which is located in the center of said guiding member and subdivides the product flow into two partial flows.

7. A self-propelled harvester thresher as defined in claim 1, wherein said threshing drum is arranged to rotate in one direction of rotation, said transferring drum being arranged to rotate in another direction of rotation which is opposite to said one direction of rotation of said threshing drum, said guiding member covering said transferring drum from above.

8. A self-propelled harvester thresher as defined in claim 7, wherein said transferring drum is arranged so that the product to be separated is supplied from said transferring drum from above radially to said separating rotor.

9. A self-propelled harvester thresher as defined in claim 1, wherein said threshing drum rotates in one direction of rotation, said transferring drum rotating in the same one direction of rotation, said guiding member covering said transferring drum from below.

10. A self-propelled harvester thresher as defined in claim 9, wherein said transferring drum is arranged so that the product to be separated is supplied from said transferring drum to said separating rotor at an end side in an axial direction.

* * * * *

REEXAMINATION CERTIFICATE (4119th)

United States Patent [19]
Roderfeld et al.

[11] B1 4,700,717
[45] Certificate Issued Jul. 18, 2000

[54] SELF-PROPELLED HARVESTER THRESHER

[75] Inventors: Heinrich Roderfeld; Johannes Dammann, both of Harsewinkel, Germany

[73] Assignee: Claas oHG, Harsewinkel, Germany

Reexamination Request:
No. 90/005,497, Sep. 16, 1999

Reexamination Certificate for:
Patent No.: 4,700,717
Issued: Oct. 20, 1987
Appl. No.: 06/734,386
Filed: May 14, 1985

[30] Foreign Application Priority Data

May 15, 1984 [DE] Germany .................................. 3417929

[51] Int. Cl.⁷ ....................................................... A01F 7/04
[52] U.S. Cl. ................................. 460/75; 460/84; 460/83
[58] Field of Search ................................. 460/75, 80, 83, 460/84

[56] References Cited

U.S. PATENT DOCUMENTS

| | | |
|---|---|---|
| 442,964 | 12/1890 | Emeis . |
| 1,110,768 | 9/1914 | George . |
| 1,729,199 | 9/1929 | Wood . |
| 1,781,472 | 11/1930 | Nagle . |
| 2,507,669 | 5/1950 | Heth ............................................. 56/21 |
| 3,464,419 | 9/1969 | Knapp et al. . |
| 3,613,691 | 10/1971 | Wilshusen . |
| 3,708,802 | 1/1973 | Wrestler et al. ......................... 56/13.3 |
| 4,209,024 | 6/1980 | Powell et al. . |
| 4,474,188 | 10/1984 | Kashino . |
| 4,478,226 | 10/1984 | Tophinke . |
| 4,606,356 | 8/1986 | Odahara . |

FOREIGN PATENT DOCUMENTS

| | | |
|---|---|---|
| 242628 | 1/1960 | Australia . |
| 28672 | 12/1956 | Finland . |
| 1436990 | 3/1966 | France . |
| 1543147 | 9/1968 | France . |
| 2517170 | 12/1981 | France . |
| 2525429 | 10/1983 | France . |
| 210515 | 6/1984 | German Dem. Rep. . |
| 1943672 | 5/1966 | Germany . |
| 1901157 | 6/1970 | Germany . |
| 2462568 | 3/1976 | Germany . |
| 3023961 | 1/1981 | Germany . |
| 2746704 | 9/1981 | Germany . |
| 3214161 | 10/1983 | Germany . |
| 3228326 | 2/1984 | Germany . |
| 2540147 | 3/1997 | Germany . |
| 214916 | 3/1968 | U.S.S.R. . |
| 957786 | 9/1982 | U.S.S.R. . |
| 1007599 | 3/1983 | U.S.S.R. . |
| 2053644 | 2/1981 | United Kingdom . |
| 2102664 | 3/1981 | United Kingdom . |
| 2057240 | 4/1981 | United Kingdom . |
| 2064285 | 6/1981 | United Kingdom . |
| 2144016 | 6/1983 | United Kingdom . |

OTHER PUBLICATIONS

Caspers Ludwig. "Systematik der Dreschorgane." *Grundlagen der Landtechnik* 19.1 (1969):9–17.

Translation of Caspers Ludwig. "Systematizing Threshing Machine." *Grundlagen der Landtechnik* 19.1 (1969): 9–17.

*Primary Examiner*—H. Shackelford

[57] ABSTRACT

A self-propelled harvester thresher has a threshing mechanism operating in accordance with a tangential product flow and having a threshing drum and a threshing basket, a separating device operating in accordance with the axial product flow and having at least one separating rotor and a housing, and a transferring drum located between the threshing mechanism and the separating device and having an axis of rotation which is located above the axis of rotation of the threshing drum and above the separating rotor in its receiving region, wherein the transferring drum is at least partially surrounded by a guiding member which corresponds to an outer circular surface of the drum and is provided with guiding skids.

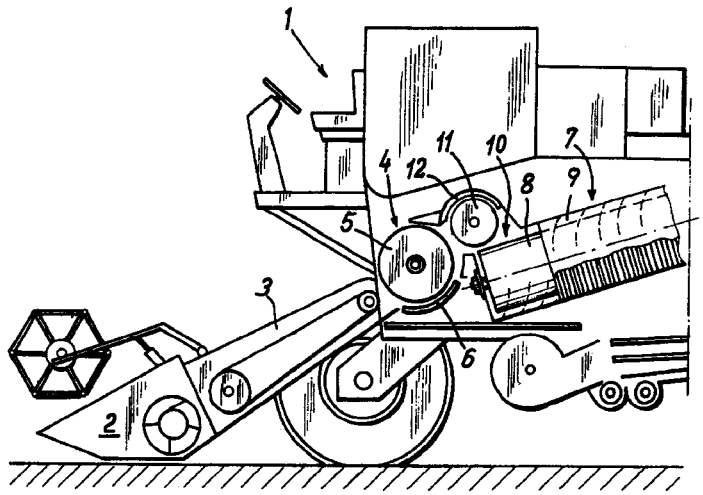

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 is confirmed.

New claims 11–22 are added and determined to be patentable.

11. *A self-propelled harvester thresher as defined in claim 1, wherein said transferring drum is arranged so that the product to be separated is supplied from said transferring drum from above radially to said separating rotor.*

12. *A self-propelled harvester thresher as defined in claim 11, wherein said threshing drum is arranged to rotate in one direction of rotation so that the product flow is beneath the threshing drum, said transferring drum has a top side and a front side as determined from the travelling direction, and said transferring drum is arranged to rotate in another direction of rotation which is opposite to said one direction of rotation of the threshing drum so that the product flow is up the front side of the transferring drum and across the top side thereof.*

13. *A self-propelled harvester thresher as defined in claim 1, wherein said separating device includes two separating rotors each having a receiving region; and wherein said guiding member includes means for separating at least part of the product flow to the separting device into two partial streams which are supplied to the respective receiving region of each separating rotor.*

14. *A self-propelled harvester thresher as defined in claim 13, wherein said guiding member has a discharge end which extends toward the receiving regions of the separating rotors.*

15. *A self-propelled harvester thresher as defined in claim 13, wherein said guiding member has two end regions and a center therebetween, and wherein said means for separating at least part of the product flow to the separating device into two partial streams is located in said center of the guiding member.*

16. *A self-propelled harvester thresher as defined in claim 13, wherein the discharge end of said guiding member is behind the tranferring mechanism as determined from said travelling direction.*

17. *A self-propelled harvester thresher as defined in claim 13, wherein said threshing drum is arranged to rotate in one direction of rotation so that the product flow is beneath the threshing drum, said transferring drum has a top side and a front side as determined from the travelling direction, and said transferring drum is arranged to rotate in another direction of rotation which is opposite to said one direction to rotation of the threshing drum so that the product flow is up the front side of the transferring drum and across the top side thereof.*

18. *A self-propelled harvester thresher as defined in claim 13, wherein said transferring drum is arranged so that the product to be separated is supplied from said transferring drum from above radially to said separating rotor.*

19. *A self-propelled harvester thresher as defined in claim 18, wherein said threshing drum is arranged to rotate in one direction of rotation so that the product flow is beneath the threshing drum, said transferring drum has a top side and a front side as determined from the travelling direction, and said transferring drum is arranged to rotate in another direction of rotation which is opposite to said one direction of rotation of the threshing drum so that the product flow is up the front side of the transferring drum and across the top side thereof.*

20. *A self-propelled harvester thresher as defined in claim 13, wherein said guiding skids are operative for narrowing the product flow.*

21. *A self-propelled harvester thresher comprising:*

*a threshing mechanism operating with a tangential product flow and extending transversely to a traveling direction, said threshing mechanism having a threshing drum rotatable about an axis of rotation in one direction of rotation so that the product flow is beneath the threshing drum, and a threshing basket associated with said threshing drum;*

*a separating device extending in the travelling direction and located after said threshing mechanism in a direction of product flow, the separating device including two separating rotors operating with an axial product flow and each having a receiving region, and a housing associated with each separating rotor;*

*a transferring mechanism for transferring the product, without its threshing or separating, from said threshing mechanism extending transversely to the travelling direction to the two separating rotors extending in the traveling direction, said transferring mechanism including a transferring drum arranged between said threshing mechanism and said separating device and rotatable about an axis which lies higher than the axis of rotation of said threshing drum of said threshing mechanism and higher than the receiving regions of the two separating rotors, the transferring drum being operative to supply the product to be separated from above and radially to the two separating rotors, said transferring drum having a top side and a front side as determined from the travelling direction, and said transferring drum being arranged to rotate in a direction of rotation which is opposite to said one direction of rotation of the threshing drum so that the product flow is up the front side of the transferring drum and across the top side thereof; and*

*a guiding member at least partially surrounding said transferring drum, said guiding member having a discharge end behind the transferring mechanism as determined from said travelling direction and said discharge end extending toward the receiving regions of the separating rotors, the guiding member being provided with a plurality of guiding skids to guide the product flow, and the guiding member including means for separating at least part of the product flow into two partial streams each of which is supplied to the respective receiving region of the two separate rotors.*

22. *A self-propelled harvester thresher as defined in claim 21, wherein said guiding skids are operative for narrowing the product flow.*

* * * * *